(12) United States Patent
Meggiolan

(10) Patent No.: US 9,079,454 B2
(45) Date of Patent: Jul. 14, 2015

(54) RIM MADE FROM COMPOSITE MATERIAL FOR A TUBELESS BICYCLE BICYCLE WHEEL AND TUBELESS BICYCLE WHEEL COMPRISING SUCH A RIM

(75) Inventor: Mario Meggiolan, Creazzo-VI (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 12/401,936

(22) Filed: Mar. 11, 2009

(65) Prior Publication Data

US 2009/0250994 A1    Oct. 8, 2009

(30) Foreign Application Priority Data

Mar. 14, 2008    (EP) .................................... 08425161

(51) Int. Cl.
| | |
|---|---|
| *B60B 21/12* | (2006.01) |
| *B60B 5/02* | (2006.01) |
| *B60B 1/00* | (2006.01) |
| *B60B 21/02* | (2006.01) |
| *B60B 21/04* | (2006.01) |
| *B60B 21/06* | (2006.01) |

(52) U.S. Cl.
CPC . *B60B 5/02* (2013.01); *B60B 21/12* (2013.01); *B60B 1/003* (2013.01); *B60B 21/025* (2013.01); *B60B 21/026* (2013.01); *B60B 21/04* (2013.01); *B60B 21/062* (2013.01); *B60B 2900/5116* (2013.01); *Y10T 29/49524* (2015.01)

(58) Field of Classification Search
CPC .... B60B 21/12; B60B 5/02; B60B 2900/5116
USPC ............. 301/95.101, 95.102, 95.103, 95.104, 301/95.106, 95.107, 95.11; 152/381.5, 152/381.6, DIG. 9, DIG. 16
See application file for complete search history.

(56) References Cited

U.S. PATENT DOCUMENTS

| | | |
|---|---|---|
| 395,523 A | 1/1889 | Taylor |
| 401,551 A | 4/1889 | Gilles |
| 452,649 A | 5/1891 | Powell |
| 521,385 A | 6/1894 | Mosley |
| 531,914 A | 1/1895 | Donnelly |
| 677,319 A | 6/1901 | McConville |
| 707,335 A | 8/1902 | Kenyon |
| 759,124 A | 5/1904 | Oswald |
| 1,286,065 A | 11/1918 | Murray |
| 1,377,173 A | 5/1921 | Allen |

(Continued)

FOREIGN PATENT DOCUMENTS

| | | |
|---|---|---|
| BE | 398573 | 10/1933 |
| CH | 179922 | 9/1935 |

(Continued)

OTHER PUBLICATIONS

Campagnolo Products Catalogue 2005, pp. 92-97.
European Search Report—EP 08425161.0-2421—dated Aug. 18, 2008.
European Search Report—EP 08006140.1—dated Mar. 25, 2009.
European Search Report—EP 08006139.3-2421—dated Apr. 6, 2009.

(Continued)

*Primary Examiner* — Kip T Kotter
(74) *Attorney, Agent, or Firm* — Volpe and Koenig, P.C.

(57) ABSTRACT

The invention concerns a rim made from composite material for a tubeless bicycle wheel comprising a radially outer portion shaped for the coupling with a tire, said radially outer portion comprising a through hole for an inflation valve. Advantageously, at least one first impermeable-to-air layer is integrally associated with said radially outer portion, around said hole.

10 Claims, 9 Drawing Sheets

(56) References Cited

U.S. PATENT DOCUMENTS

Figure 1:
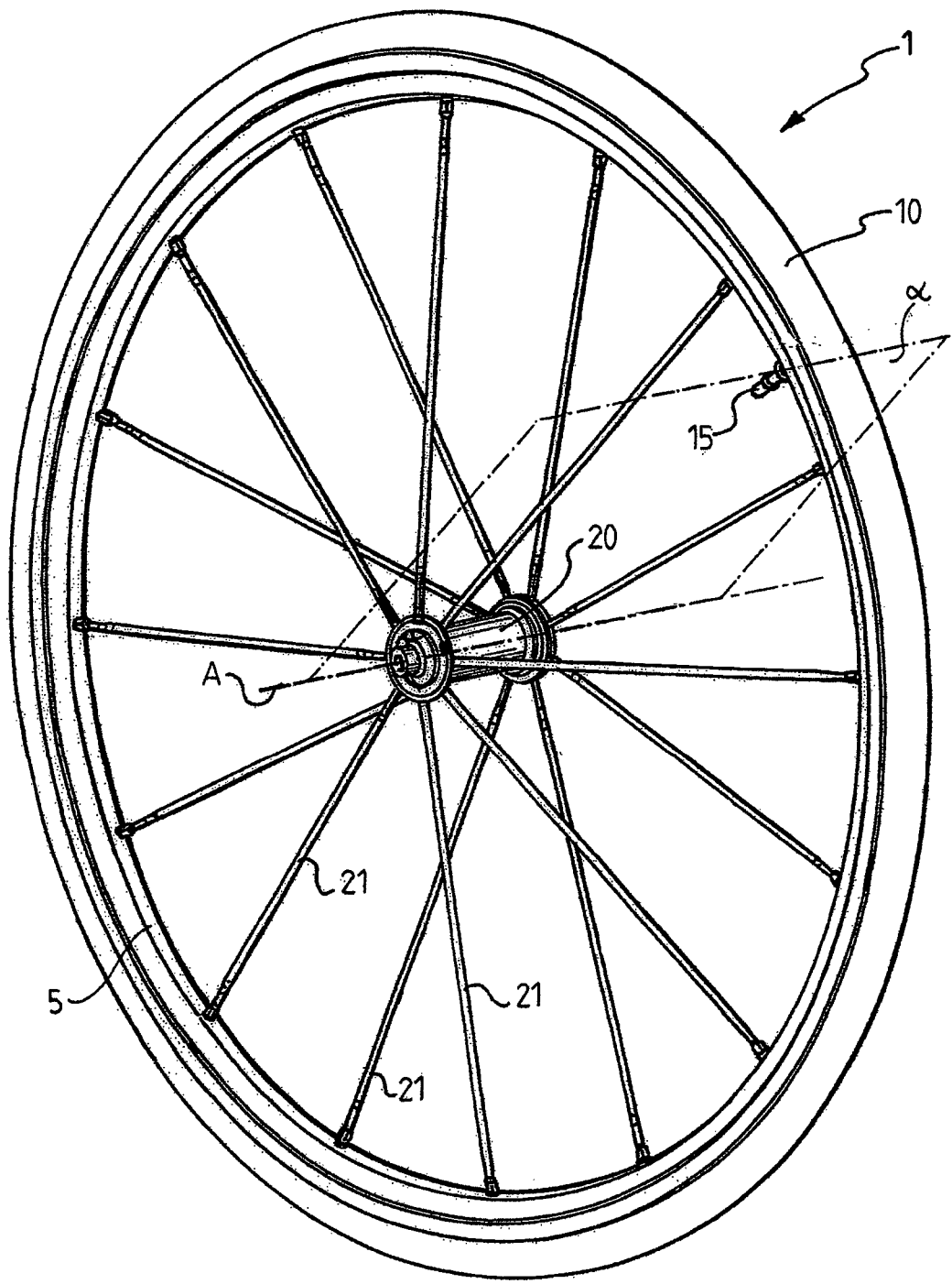

| | | |
|---|---|---|
| 1,393,797 A | 10/1921 | Lachman |
| 1,402,003 A | 1/1922 | Miller |
| RE15,366 E | 5/1922 | Dressel |
| 1,467,588 A | 9/1923 | Prescott et al. |
| 1,484,844 A | 2/1924 | Ollie |
| 1,542,630 A | 6/1925 | Meredith |
| 1,667,344 A | 4/1928 | Couture |
| 1,684,290 A | 9/1928 | Starling |
| 1,689,649 A | 10/1928 | Wagehhoest |
| 1,833,879 A | 11/1931 | Ash |
| 1,847,774 A | 3/1932 | Main et al. |
| 1,889,577 A | 11/1932 | Milton |
| 2,840,133 A | 6/1958 | Billingsley |
| 2,937,905 A | 5/1960 | Altenburger |
| 3,253,862 A | 5/1966 | Watanbe et al. |
| 3,758,931 A | 9/1973 | Patterson |
| 4,040,671 A | 8/1977 | Hersh |
| 4,146,274 A | 3/1979 | Lejeune |
| 4,150,854 A * | 4/1979 | Lohmeyer ............... 301/58 |
| 4,153,267 A | 5/1979 | Hilber |
| 4,173,992 A | 11/1979 | Lejeune |
| 4,181,365 A | 1/1980 | Kawaguchi et al. |
| 4,376,749 A | 3/1983 | Woelfel |
| 4,527,839 A | 7/1985 | Fujitaka et al. |
| 4,564,056 A | 1/1986 | Doring |
| 4,574,446 A | 3/1986 | Kaufeldt et al. |
| 4,614,678 A | 9/1986 | Ganga |
| 4,702,527 A | 10/1987 | Kawano |
| 4,749,235 A | 6/1988 | McDougall |
| 4,832,414 A | 5/1989 | Jones |
| 4,909,576 A | 3/1990 | Zampieri |
| 4,983,430 A | 1/1991 | Sargent |
| 5,073,315 A | 12/1991 | Bertelson |
| 5,215,137 A | 6/1993 | Weeks et al. |
| 5,271,663 A | 12/1993 | Maldini et al. |
| 5,512,119 A | 4/1996 | Takezawa et al. |
| 5,522,630 A | 6/1996 | James |
| 5,534,203 A | 7/1996 | Nelson et al. |
| 5,540,485 A | 7/1996 | Enders |
| 5,549,360 A | 8/1996 | Lipeles |
| 5,603,553 A | 2/1997 | Klieber et al. |
| 5,650,229 A | 7/1997 | Gross et al. |
| 5,653,510 A | 8/1997 | Osborne |
| 5,919,044 A | 7/1999 | Sicurelli, Jr. et al. |
| 5,960,834 A | 10/1999 | Sekido et al. |
| 5,975,646 A | 11/1999 | Campagnolo |
| 6,019,149 A * | 2/2000 | Stringer ............... 152/381.5 |
| 6,024,413 A | 2/2000 | Dixon et al. |
| 6,036,279 A | 3/2000 | Campagnolo |
| 6,048,035 A | 4/2000 | Chen |
| 6,086,161 A | 7/2000 | Luttgeharm et al. |
| 6,089,672 A | 7/2000 | Chen |
| 6,126,243 A | 10/2000 | Okajima et al. |
| 6,155,651 A | 12/2000 | Mizata et al. |
| 6,183,047 B1 | 2/2001 | Kuhl |
| 6,190,481 B1 | 2/2001 | Iida et al. |
| 6,196,638 B1 | 3/2001 | Mizuno et al. |
| 6,228,474 B1 | 5/2001 | Kishi et al. |
| 6,237,662 B1 * | 5/2001 | Thomasberg ............... 152/510 |
| 6,257,676 B1 | 7/2001 | Lacombe et al. |
| 6,283,557 B1 * | 9/2001 | Okajima et al. ......... 301/95.104 |
| 6,318,428 B1 * | 11/2001 | Lo ............... 152/381.4 |
| 6,347,839 B1 | 2/2002 | Lew et al. |
| 6,367,883 B1 | 4/2002 | Chen |
| 6,378,953 B2 | 4/2002 | Mercat et al. |
| 6,402,256 B1 | 6/2002 | Mercat |
| 6,425,641 B1 | 7/2002 | Herting |
| 6,443,533 B2 | 9/2002 | Lacombe et al. |
| 6,450,226 B2 | 9/2002 | DeLacroix et al. |
| 6,536,849 B1 | 3/2003 | Okajima et al. |
| 6,557,946 B1 | 5/2003 | Gerrit et al. |
| 6,588,474 B2 | 7/2003 | Passarotto |
| 6,593,255 B1 | 7/2003 | Lawton et al. |
| 6,672,352 B2 | 1/2004 | Yamagiwa et al. |
| 6,761,847 B2 | 7/2004 | Meggiolan |
| 6,783,192 B2 | 8/2004 | Meggiolan |
| 6,926,370 B2 | 8/2005 | Spoelstra |
| 6,938,962 B1 | 9/2005 | Schlanger |
| 6,957,926 B2 | 10/2005 | Okuda |
| 6,991,300 B2 | 1/2006 | Colegrove |
| 7,032,769 B2 | 4/2006 | Iida et al. |
| 7,090,307 B2 | 8/2006 | Okajima |
| 7,431,404 B2 * | 10/2008 | Senoo ............... 301/95.106 |
| 7,448,696 B2 | 11/2008 | Meggiolan et al. |
| 7,487,811 B2 * | 2/2009 | Schelhaas ............... 152/381.5 |
| 2001/0005913 A1 | 7/2001 | Elsener et al. |
| 2001/0019222 A1 | 9/2001 | Campagnolo |
| 2002/0066316 A1 | 6/2002 | Kashiwai et al. |
| 2002/0067066 A1 | 6/2002 | Kashiwai et al. |
| 2002/0108249 A1 | 8/2002 | Meggiolan |
| 2004/0095014 A1 * | 5/2004 | Veux et al. ............... 301/58 |
| 2004/0139609 A1 | 7/2004 | Meggiolan et al. |
| 2005/0017569 A1 | 1/2005 | Passarotto |
| 2005/0189813 A1 * | 9/2005 | Bauer ............... 301/95.104 |
| 2005/0210675 A1 * | 9/2005 | Price et al. ............... 29/894.31 |
| 2006/0043784 A1 | 3/2006 | Passarotto |
| 2006/0181140 A1 | 8/2006 | Mercat et al. |
| 2006/0200989 A1 * | 9/2006 | Possarnig et al. ........... 29/894.35 |
| 2007/0063577 A1 | 3/2007 | Passarotto |
| 2007/0158996 A1 | 7/2007 | Meggiolan |
| 2009/0134693 A1 | 5/2009 | Meggiolan |
| 2009/0134695 A1 | 5/2009 | Meggiolan |
| 2009/0250994 A1 | 10/2009 | Meggiolan |
| 2010/0013119 A1 | 1/2010 | Meggiolan |
| 2011/0127827 A1 | 6/2011 | Andrews |

FOREIGN PATENT DOCUMENTS

| | | |
|---|---|---|
| CH | 218795 | 12/1941 |
| CN | 2709212 | 7/2005 |
| DE | 4127500 C1 | 10/1992 |
| DE | 4425592 A1 | 1/1996 |
| DE | 4444044 A1 | 6/1996 |
| DE | 102004055892 | 5/2006 |
| DE | 102006029468 | 8/2007 |
| EP | 0154666 | 9/1985 |
| EP | 0324630 A2 | 7/1989 |
| EP | 0579525 | 1/1994 |
| EP | 0615865 | 9/1994 |
| EP | 0715001 | 6/1996 |
| EP | 0893280 | 1/1999 |
| EP | 0896886 A1 | 1/1999 |
| EP | 1084868 A1 | 3/2001 |
| EP | 1101631 A1 | 5/2001 |
| EP | 0936085 A3 | 10/2001 |
| EP | 1167078 A1 | 1/2002 |
| EP | 1231077 A2 | 8/2002 |
| EP | 1314579 A2 | 5/2003 |
| EP | 1314579 A3 | 5/2003 |
| EP | 1479533 | 11/2004 |
| FR | 657185 | 5/1929 |
| FR | 833629 | 6/1937 |
| FR | 2426579 A * | 1/1980 |
| FR | 2474403 | 7/1981 |
| FR | 2765150 | 6/1997 |
| GB | 281229 | 5/1928 |
| GB | 913967 | 12/1962 |
| GB | 2009662 | 6/1979 |
| JP | 5553632 | 10/1953 |
| JP | 56102201 | 1/1955 |
| JP | 329153 | 7/1955 |
| JP | 49042132 | 11/1974 |
| JP | 5125421 | 6/1976 |
| JP | 57091603 | 6/1982 |
| JP | 60080902 | 10/1983 |
| JP | 58191601 | 11/1983 |
| JP | 59193702 | 12/1984 |
| JP | 60012315 A | 1/1985 |
| JP | 60157901 | 8/1985 |
| JP | 60275078 | 9/1985 |
| JP | 61118801 | 7/1986 |
| JP | 61175005 | 10/1986 |
| JP | 62119639 | 5/1987 |
| JP | 62275801 A | 11/1987 |

(56) References Cited

FOREIGN PATENT DOCUMENTS

| | | |
|---|---|---|
| JP | 63031802 | 2/1988 |
| JP | 01226401 | 9/1989 |
| JP | 04306101 | 10/1992 |
| JP | 07117423 | 5/1995 |
| JP | 08207503 | 8/1996 |
| JP | 3025849 | 10/1996 |
| JP | 2002166702 | 11/2002 |
| JP | 2003094902 | 4/2003 |
| JP | 2003098027 | 4/2003 |
| JP | 2003260901 | 9/2003 |
| JP | 200372301 | 12/2003 |
| RU | 2096188 C1 | 7/1996 |
| TW | 497556 | 8/2002 |
| TW | 505113 | 10/2002 |
| WO | 9309963 | 5/1993 |
| WO | 0232695 | 4/2002 |
| WO | 0240295 | 5/2002 |
| WO | 2007027927 | 3/2007 |

OTHER PUBLICATIONS

Extended European Search Report—Application No. 08006139.3-2421—dated Jul. 30, 2009.
English translation of Office Action for Japanese Patent Appln. No. 2004-329603—dated Dec. 8, 2009.
English translation of Office Action for Japanese Patent Appln. No. 2005-251583—dated Jul. 13, 2010.
English translation of Office Action issued in corresponding Taiwanese Appln. 094129965—dated Apr. 20, 2011.
Japanese Office Action for Japanese Patent Appln. No. 2005-251583—dated May 10, 2011.
English translation of Office Action for Japanese Patent Appln. No. 2005-251583—dated May 10, 2011.
Chinese Office Action for Chinese Patent Appln. No. 200810177972.2—dated May 18, 2011.
English translation of Office Action for Chinese Patent Appln. No. 200810177972.2—dated May 18, 2011.

* cited by examiner

RIM MADE FROM COMPOSITE MATERIAL FOR A TUBELESS BICYCLE BICYCLE WHEEL AND TUBELESS BICYCLE WHEEL COMPRISING SUCH A RIM

The present invention concerns a rim made from composite material for a tubeless bicycle wheel.

The present invention also concerns a rim assembly and a tubeless wheel comprising such a rim, as well as a bicycle comprising such a wheel. Preferably, the aforementioned bicycle is a racing bicycle.

The present invention also concerns a method for manufacturing the aforementioned rim for a tubeless bicycle wheel.

Typically, a bicycle wheel comprises a rim, on which a tyre is mounted, a hub and a plurality of spokes extending between the rim and the hub.

In particular, the present patent application is referred to a so-called "tubeless" tyre, i.e. without an inner tube with annular extension, mounted between a radially outer portion of the rim and the tyre, which is inflated by introducing air through an inflation valve of such a tube. The inflated inner tube presses against the tyre, taking it into the operative condition of desired "inflation".

In the tubeless wheel, on the contrary, the tyre is mounted airtight on a radially outer portion of the rim, so as to form an airtight annular chamber in which there is pressurised air introduced through an inflation valve associated with the rim at a suitable through hole formed in the radially outer portion of the rim. Air is put into such a chamber until the tyre has reached the operative condition of desired "inflation".

In the prior art rims made from composite material, comprising carbon fibres incorporated in an epoxy matrix, are widely used.

Such rims are produced with a curing step in a suitable mould, maintaining a predetermined high temperature for a predetermined time. A through hole for the inflation valve is then made on the rim obtained from the mould.

The inflation valve normally comprises a threaded shank and a head made from elastically deformable material at an end thereof, such a head being widened with respect to the size of the shank. The shank is inserted into the through hole of the rim so that a radially inner surface of the widened head goes into abutment on the radially outer portion of the rim, on the side thereof directed towards the tyre.

The shank is also longer than the thickness of the rim, so that a nut, or a ring nut, can be screwed onto the shank, from its end opposed to that of the widened head, until it comes into abutment on a radially inner surface of the rim. In particular, by further tightening the nut, or the ring nut, the widened head made from elastically deformable material is compressed against a surface of the radially outer portion of the rim arranged around the inflation hole, so as to make an airtight closure of the inflation hole itself.

Although advantageous from the point of view of the simplicity of manufacture, the Applicant has found that a rim made from composite material for a tubeless bicycle wheel manufactured according to the aforementioned prior art has some drawbacks, the main one of which is linked to the fact that the tubeless wheels comprising the aforementioned rim are frequently subject to deflation problems, which often become apparent after only a few kilometres run by the cyclist.

The technical problem at the basis of the present invention is to provide a rim made from composite material for a tubeless bicycle wheel that gives the tubeless wheel a high reliability, so as to overcome the drawbacks aforementioned with reference to the prior art, in a simple and effective manner.

Therefore the present invention, in a first aspect thereof, concerns a rim made from composite material for a tubeless bicycle wheel comprising a radially outer portion shaped for the coupling with a tyre, the radially outer portion comprising a through hole for an inflation valve, characterised in that at least one first impermeable-to-air layer is integrally associated with the radially outer portion, around said hole.

In the present patent application, by "composite material" it is meant a material comprising at least two components, including a polymeric matrix and a filler comprising for example structural fibres.

In the present application by "impermeable-to-air material" it is also meant any material without porosity, crackings or defects such as to allow air to pass, like for example a rubber.

The Applicant has surprisingly found that a tubeless wheel comprising the aforementioned rim ensures that a correct inflation of the tyre is maintained for an extremely long time. Indeed, the Applicant has surprisingly found that a crucial point for the deflation is not so much the hole but the portion of composite material around the hole. By making this portion impermeable-to-air the wheel remains inflated for much longer periods. The Applicant has discovered that this advantageous effect is due to the fact that the impermeable layer prevents air from coming out through possible through cracks or porosities (even very small sized ones) that can form, in a totally uncontrollable way, in the polymeric matrix of the composite material when the through hole itself is made, for example with a drill.

It should be observed that in the layer of impermeable-to-air material, even if associated with the radially outer portion before the through hole is drilled, crackings do not form, for which reason the air—even in the presence of the aforementioned through cracks of the composite material—stops against this layer and does not come out.

Furthermore, it should be observed that the integral association of the aforementioned layer with the radially outer portion has the advantage of avoiding that, in the mounted tubeless wheel, the layer becomes crumpled up under the head of the inflation valve, for example due to a rotation thereof whilst it is locked on the rim. Moreover, by integrally associating the layer with the radially outer portion, the assembly operations of the tubeless wheel are made easier.

Preferably, the aforementioned first layer is at least partially arranged to coat the radially outer portion.

More preferably, the aforementioned layer is arranged on a radially outer surface of the radially outer portion that is intended, in a configuration with the wheel mounted, to face the tyre. In this way, advantageously, the aforementioned layer is in contact with the head of the inflation valve, when it is mounted on the rim.

Even more preferably, the aforementioned rim comprises a second layer made from impermeable-to-air material and arranged, around the through hole, on a radially inner surface of the radially outer portion, opposite the radially outer surface. In this way, an even greater reliability is advantageously ensured.

In a further preferred embodiment of the rim of the invention, the aforementioned layer is arranged at least partially on the side walls that define the through hole. In this case, the through hole can be initially closed by elastic impermeable-to-air material, which is, subsequently, centrally perforated to make a smaller sized hole, intended for the inflation valve, with the advantage that crackings do not form on such an impermeable-to-air material.

In a further preferred embodiment of the rim of the invention, the aforementioned layer is at least partially arranged inside the thickness of the radially outer portion.

Preferably, the aforementioned impermeable-to-air material is elastically deformable.

In this way, the aforementioned layer is advantageously able to perfectly couple with the elastically deformable material of the head of a valve inserted in the inflation hole, so as to make an airtight coupling, even in the case in which the two respective contact surfaces are not homogeneous. Indeed, since both the aforementioned layer and the head of the valve are elastically deformable, it is possible to make a mutual adaptation to the shape disuniformities in their contact area, for which reason an optimal airtight seal is obtained.

Preferably, the aforementioned elastically deformable material is an elastomer.

In a first preferred embodiment of the rim of the invention, the aforementioned layer is glued to the radially outer portion.

In a second preferred embodiment of the rim of the invention, the aforementioned layer is co-moulded with the radially outer portion. In this way, the aforementioned layer is advantageously intimately linked with the composite material of the rim, substantially penetrating into the possible cracks of the composite material itself.

According to a further preferred embodiment of the rim of the invention, the aforementioned layer is a resin.

Preferably, such a resin incorporates particles of elastomer, which give the resin the elastic properties.

Preferably, the resin is applied by spraying onto the radially outer portion. In this way, especially if the rim on which such a resin is applied by spraying is subjected to a subsequent setting step, the aforementioned layer of resin is advantageously intimately linked with the composite material of the rim, substantially penetrating into the possible cracks of the composite material itself. Moreover, advantageously, such a method of application of the aforementioned layer reduces the time to make the rim of the invention.

Even more preferably, the aforementioned layer is arranged on a radially outer surface of the radially outer portion that is intended, in a configuration with the wheel mounted, to face the tyre. In this way, the airtight seal of the coupling between layer and head of the inflation valve mounted on the rim is advantageously improved, especially in the case in which the resin incorporates particles of elastomer.

Preferably, the aforementioned elastomer with which the aforementioned layer is made or that is incorporated into the aforementioned resin, is selected from the group consisting of nitrite elastomers, hydrogenated nitrite elastomers, ethylene propylene (EPM o EPDM), chloroprene elastomers, polyethylene chlorosulfate, polyacrylic elastomers, and fluorine elastomers. In the tests carried out by the Applicant, such elastomers proved particularly suitable for use in the rim of the invention.

Preferably, the aforementioned layer of the rim of the invention has a heat resistance above 85° C., and more preferably above 130° C. Even more preferably, such a layer has a heat resistance above 180° C.

In the present patent application, by "heat resistance" of a material it is meant its temperature of glass transition which is known as "Tg", above which the cured material softens and possibly chemically degrades losing the physical and mechanical properties.

Advantageously, the aforementioned layer can withstand the high temperatures reached by the rim in the case in which it stays closed in a car under the sun or in the case in which, in use, the braking takes place by friction of the brakes on an outer edge of the rim.

Preferably, the aforementioned layer of the rim of the invention has a "Shore A" surface hardness, according to the standard DIN 53505, within the range 63±20%, including extremes.

In this way, advantageously, the inflation valve can be mounted on the rim by tightening the nut, or the ring nut, with a very high force, without fear of damaging or lacerating the layer of impermeable-to-air material.

In a preferred embodiment of the rim of the invention, on a radially outer surface of the radially outer portion, arranged around the through hole, a housing seat is formed for a widened head of the inflation valve.

In this way, advantageously, the assembly of the tubeless wheel comprising the aforementioned rim is made easy and an optimal coupling is made between rim and inflation valve. Indeed, the housing seat allows the inflation valve to be kept in a desired position during the insertion into the respective through hole of the rim, ensuring the correct assembly of the inflation valve on the rim, irrespective of the ability of the operator who performs the assembly.

In a preferred embodiment of the rim of the invention, in the case in which the aforementioned layer is arranged on a radially outer surface of the radially outer portion of the rim, the layer has a transversal extension, measured transversally with respect to the through hole, which is greater than the transversal extension of the area of said radially outer surface of said radially outer portion, arranged around the through hole and that is intended, in a configuration with the wheel mounted, to be in contact with a widened head of the inflation valve.

In this way, the head of the valve mounted on the aforementioned rim completely rests on the aforementioned layer, thus improving the airtight seal between valve and rim at the through hole.

In a further preferred embodiment of the rim of the invention, the aforementioned layer is integrally associated along the entire circumferential extension of the radially outer portion.

The tubeless wheel comprising the aforementioned rim made from composite material has an even greater reliability than that obtained in the previous cases, since air is prevented from coming out from possible further cracks of the radially outer portion of the rim, which are created in areas located far from the through hole. Such further cracks can be created due to the processings to which the rim made from composite material is subjected, in particular in the milling processing carried out on the rim extracted from the setting mould, such a processing being necessary to make, on the rim, extremely precise surfaces of coupling with the tyre to prevent air leaks, the setting mould being unable to ensure such a high precision.

In a second aspect thereof, the present invention concerns a rim assembly comprising a rim of the type described above and an inflation valve crossing the through hole.

Preferably, such a rim assembly separately or in combination has all of the structural and functional characteristics discussed above with reference to the aforementioned rim and therefore it has all of the aforementioned advantages.

Preferably, the inflation valve of the aforementioned rim assembly comprises a widened head in abutment on the radially outer portion of the rim.

In an embodiment thereof, in the case in which the impermeable-to-air material of the aforementioned layer is a resin arranged on a radially outer surface of the radially outer portion of the rim, the inflation valve of the aforementioned rim assembly is glued to the radially outer portion of the rim through the resin itself. Advantageously, in this case, the resin also acts as an adhesive.

In another embodiment thereof, in the case in which the impermeable-to-air material of the aforementioned layer is an elastomer, the inflation valve of the rim assembly of the invention comprises a widened head made from elastomer, formed in one piece with the elastomer of the aforementioned layer. In this way, the perfect airtight seal is substantially ensured.

In a third aspect thereof, the present invention concerns a tubeless bicycle wheel comprising a rim assembly of the type described above and a tyre mounted in an airtight manner on the radially outer portion of the rim.

Preferably, such a tubeless wheel separately or in combination has all of the structural and functional characteristics discussed above with reference to the aforementioned rim, or the aforementioned rim assembly, respectively, and therefore it has all of the aforementioned advantages.

In a fourth aspect thereof, the present invention concerns a bicycle comprising a tubeless wheel of the type described above.

Preferably, such a bicycle separately or in combination has all of the structural and functional characteristics discussed above with reference to the aforementioned tubeless wheel and therefore it has all of the aforementioned advantages.

In a fifth aspect thereof, the present invention concerns a method for manufacturing a rim made from composite material for a tubeless bicycle wheel, comprising the steps of:
A. forming a substantially annular body of composite material, having a radially outer portion shaped for the coupling with a tyre, prearranging fillers in a matrix of polymeric material;
B. forming a through hole in the radially outer portion;
C. arranging at least one first impermeable-to-air layer around the through hole;
D. making the aforementioned at least one first layer integral with the radially outer portion.

The Applicant has found that a tubeless wheel comprising the rim made with such a method ensures excellent reliability, thanks to the provision of the aforementioned impermeable-to-air layer, for the same reasons outlined above in reference to the rim of the invention.

It should be observed that the aforementioned layer can be a resin.

The present invention also concerns a further method for manufacturing a rim made from composite material for a tubeless bicycle wheel, with which a rim that is extremely reliable is obtained, too. Such a further method comprises the steps of:
A. forming a substantially annular body of composite material, having a radially outer portion shaped for the coupling with a tyre, prearranging fillers in a matrix of polymeric material;
B. arranging at least one first impermeable-to-air layer in an area of the radially outer portion;
C. forming, at the aforementioned area, inside it, a hole that crosses the radially outer portion and the aforementioned at least one first layer;
D. making the aforementioned at least one first layer integral with the radially outer portion.

Preferably, the aforementioned first layer of the methods of the invention is elastically deformable.

In a preferred embodiment of the methods of the invention, the respective integral-making step comprises a gluing of the aforementioned at least one layer to the radially outer portion.

In a variant of the methods of the invention, the respective integral-making step preferably comprises a co-moulding of the aforementioned at least one layer with the radially outer portion. In this way, the aforementioned layer is advantageously intimately linked with the composite material of the rim, substantially penetrating into the possible cracks of the composite material itself.

In a further variant of the methods of the invention, the respective integral-making step preferably comprises a spray application of the aforementioned at least one layer onto the radially outer portion. Also in this case, the aforementioned layer is advantageously intimately linked with the composite material of the rim, substantially penetrating into the possible cracks of the composite material itself.

Preferably, the aforementioned integral-making step comprises a setting of the said substantially annular body and of the aforementioned at least one layer, maintaining a temperature of between 85° C. and 250° C. for a predetermined time.

In this way, the aforementioned layer is advantageously intimately linked with the composite material of the rim, substantially penetrating into the possible cracks of the composite material itself.

In a further variant of the methods of the invention, in the respective integral-making step, the aforementioned at least one layer is integral-made along the entire circumferential extension of the radially outer portion.

A tubeless wheel comprising the rim made in this way ensures an even greater reliability than that obtained in the previous cases, since air is prevented from coming out from possible further cracks of the radially outer portion of the rim, which are created—as mentioned above—in areas located far from the through hole.

Figure 2:
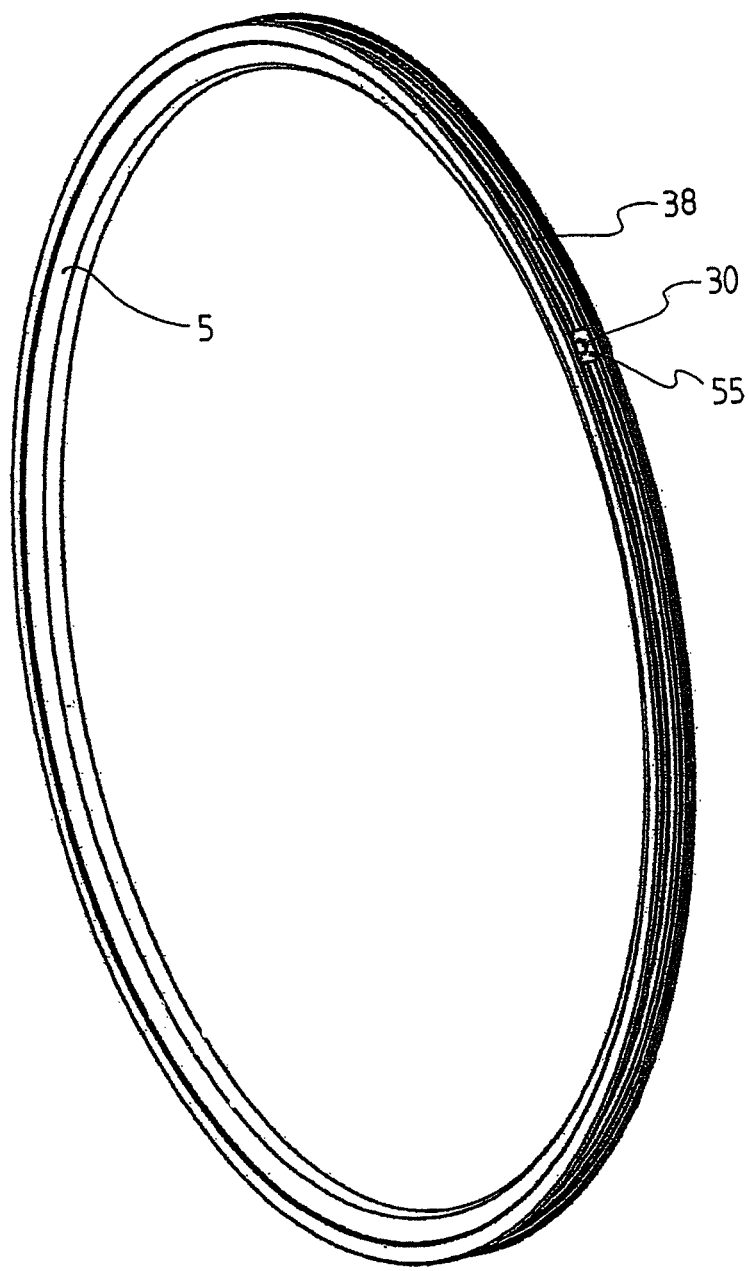
Figure 3:
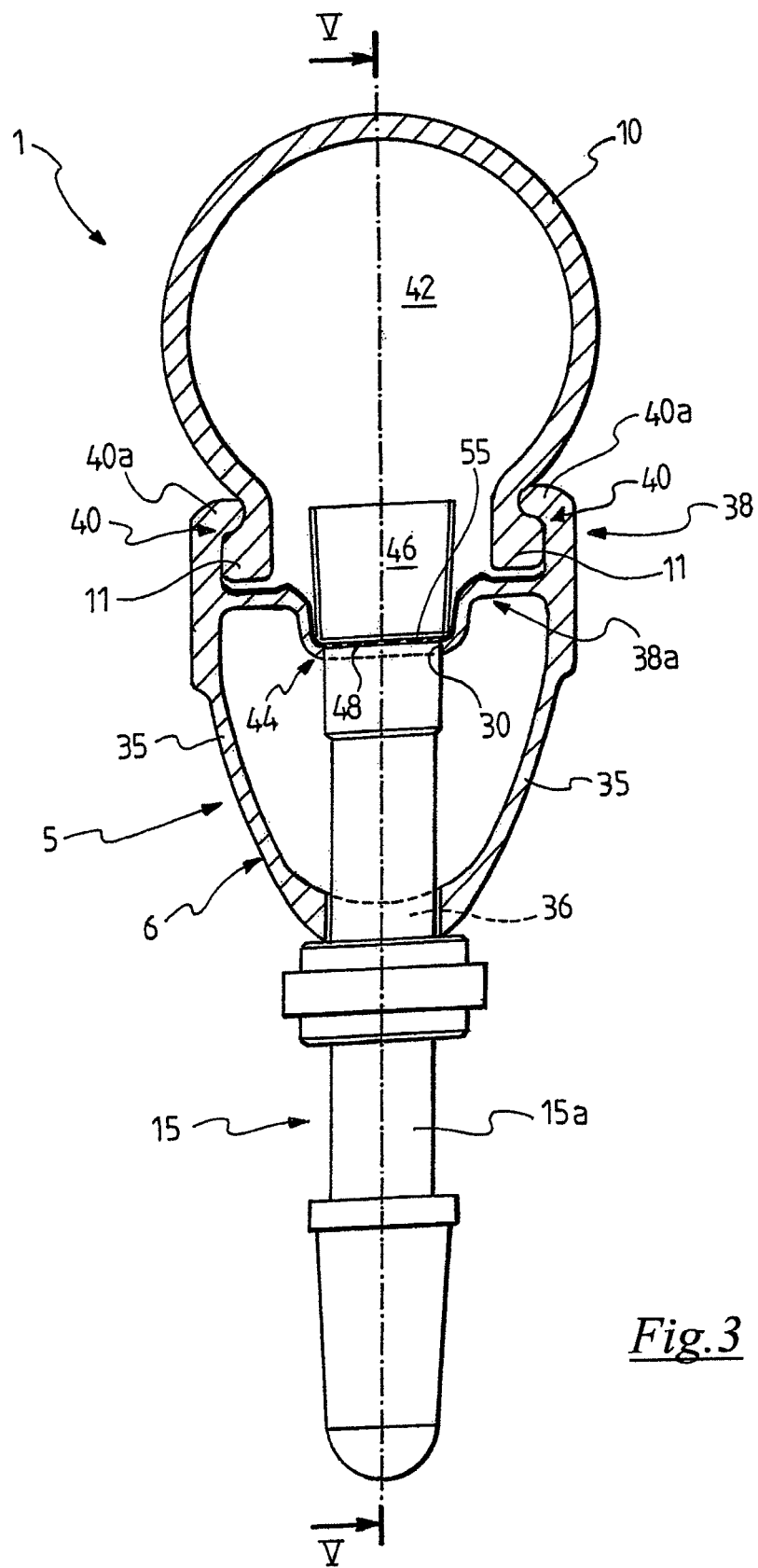
Figure 4:
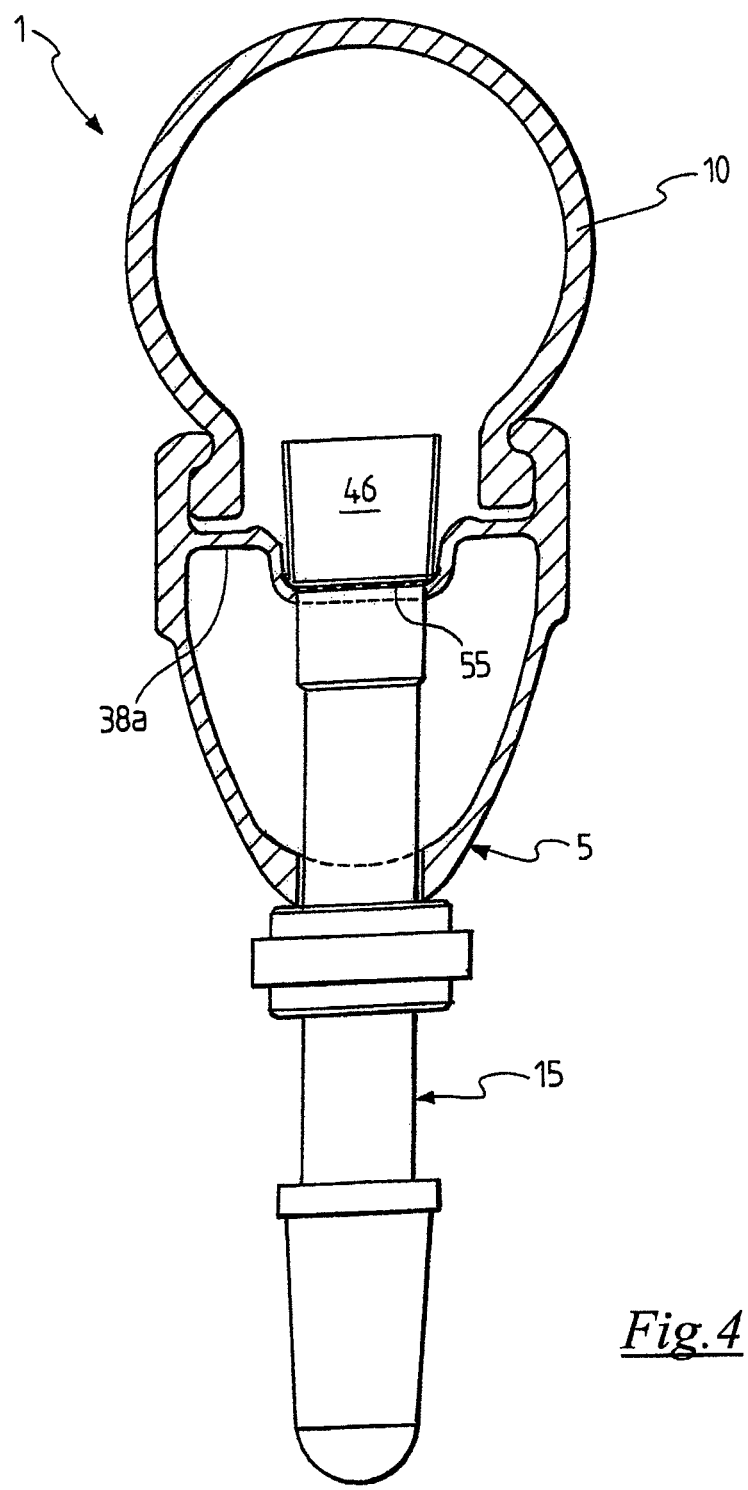
Figure 5:
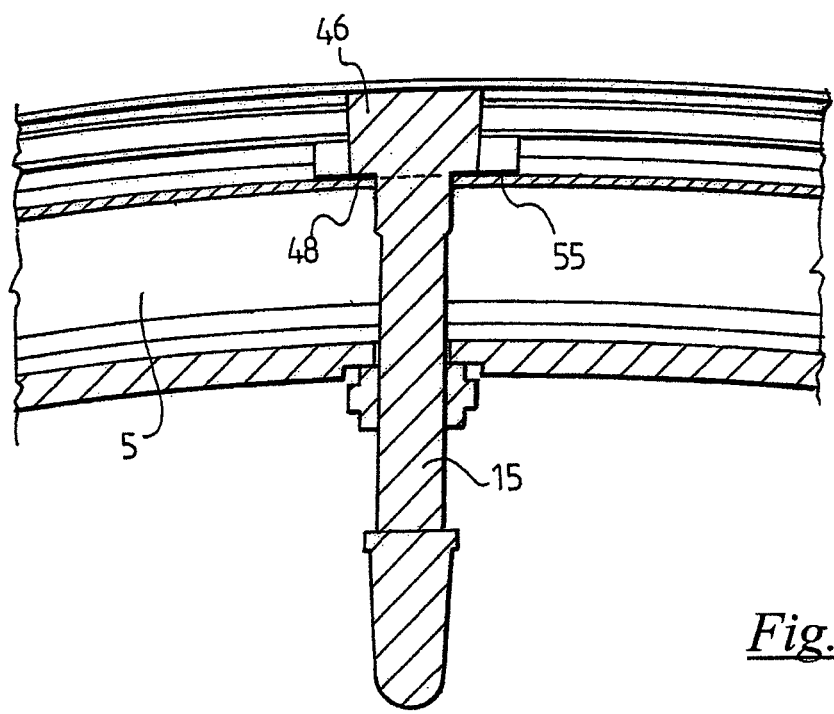
Figure 6:
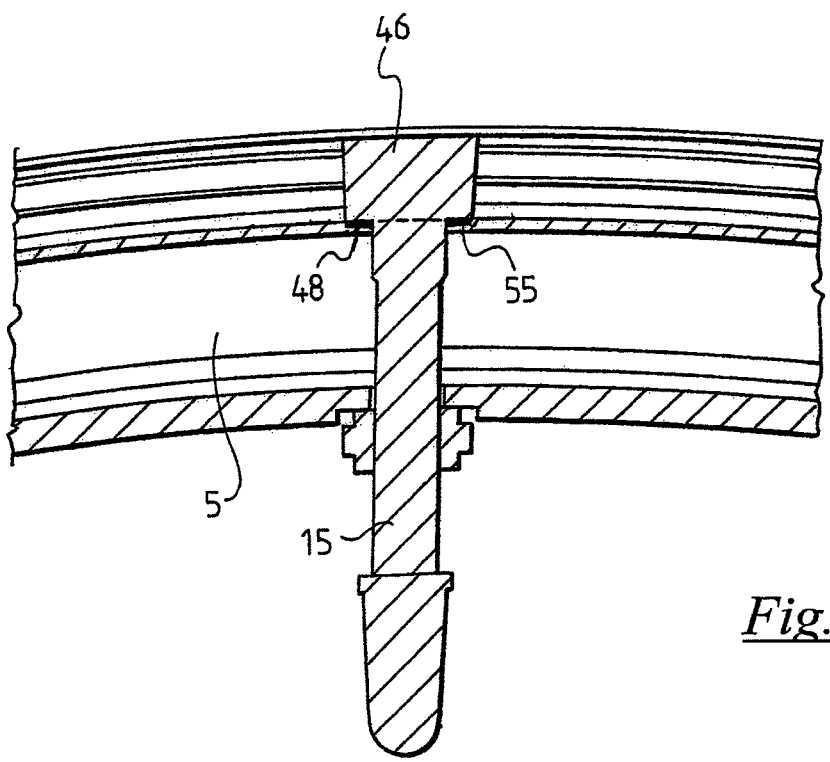
Figure 7:
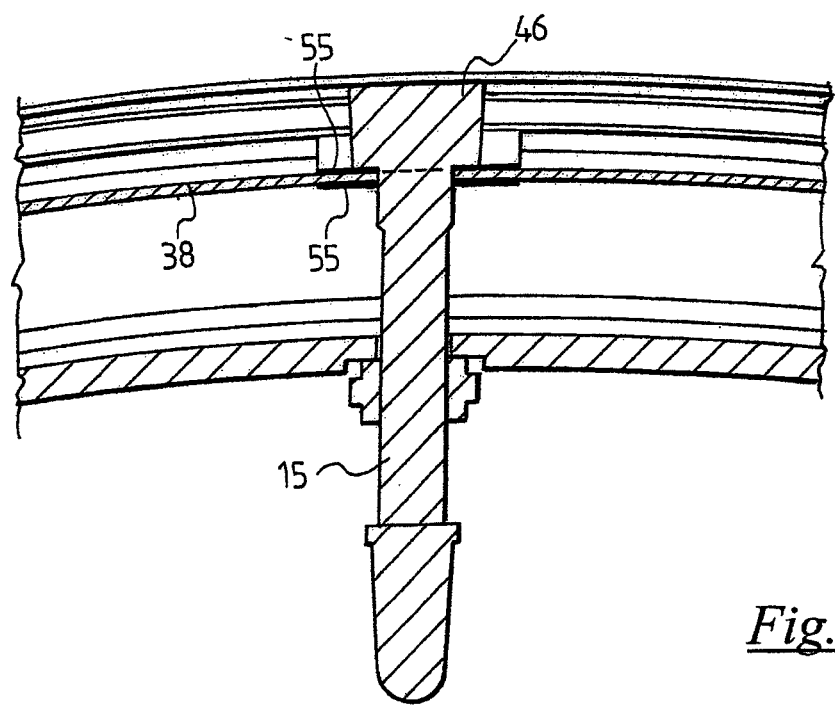
Figure 8:
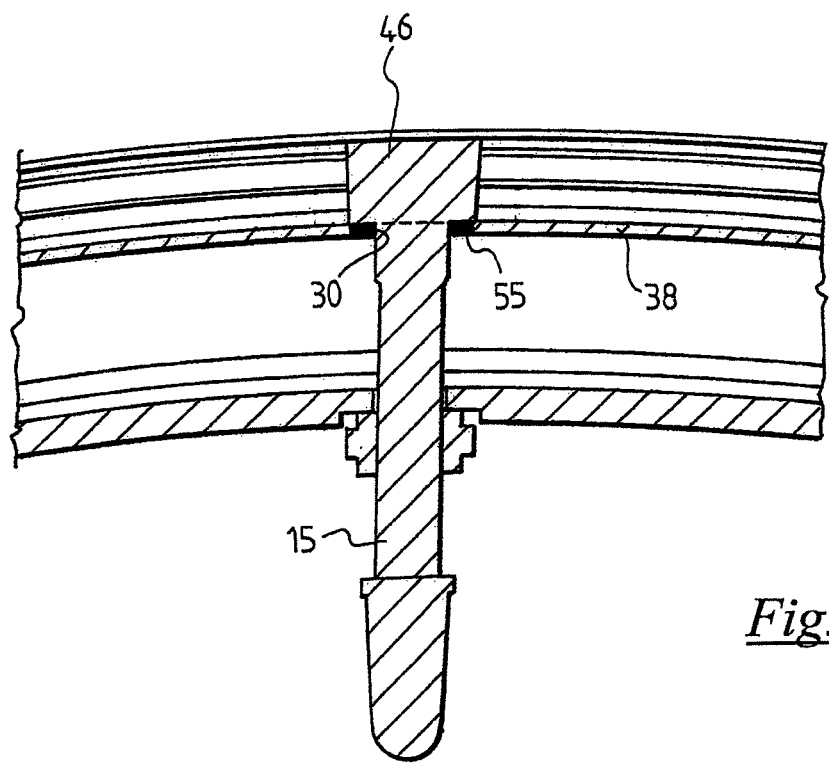
Figure 9:
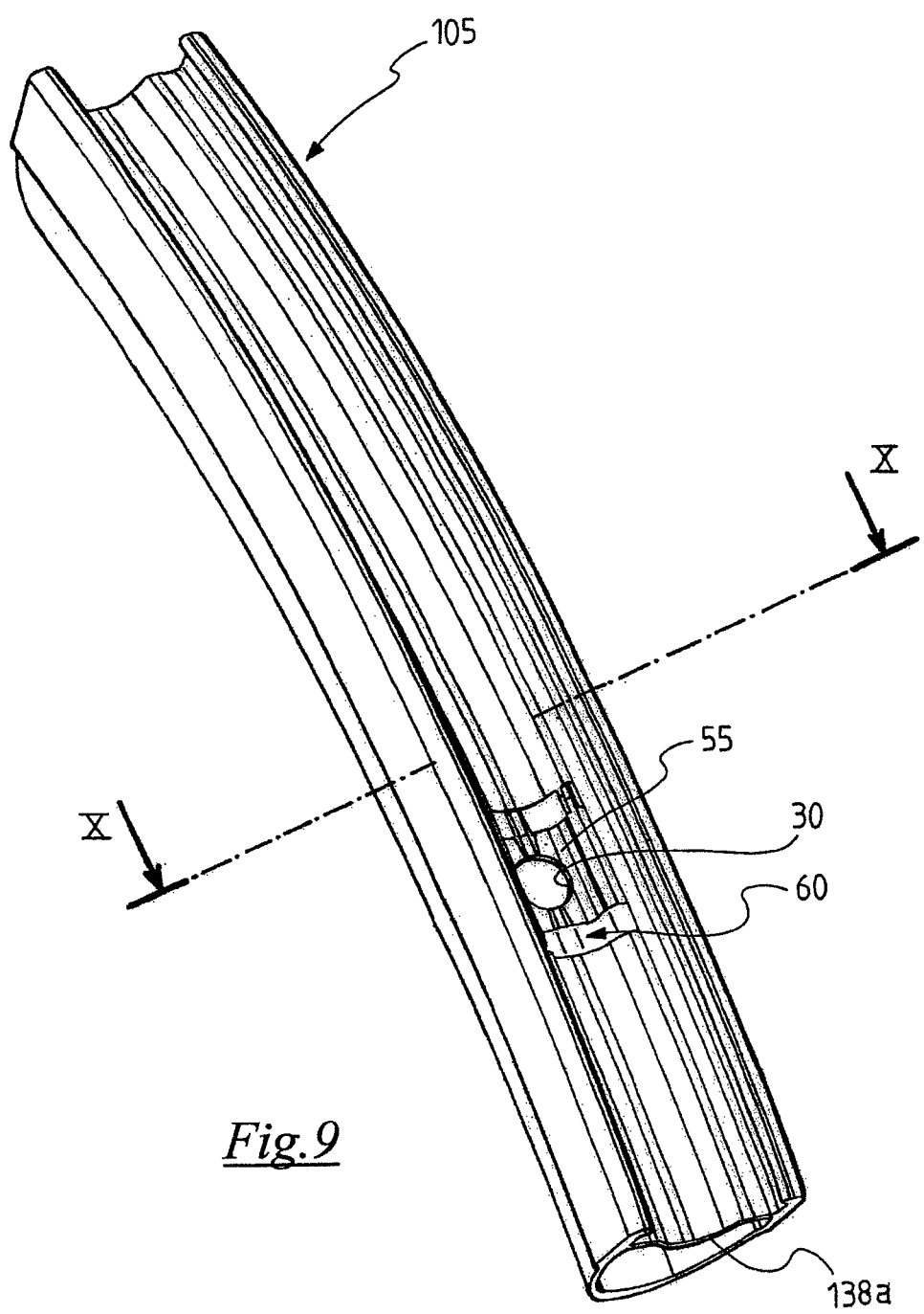
Figure 10:
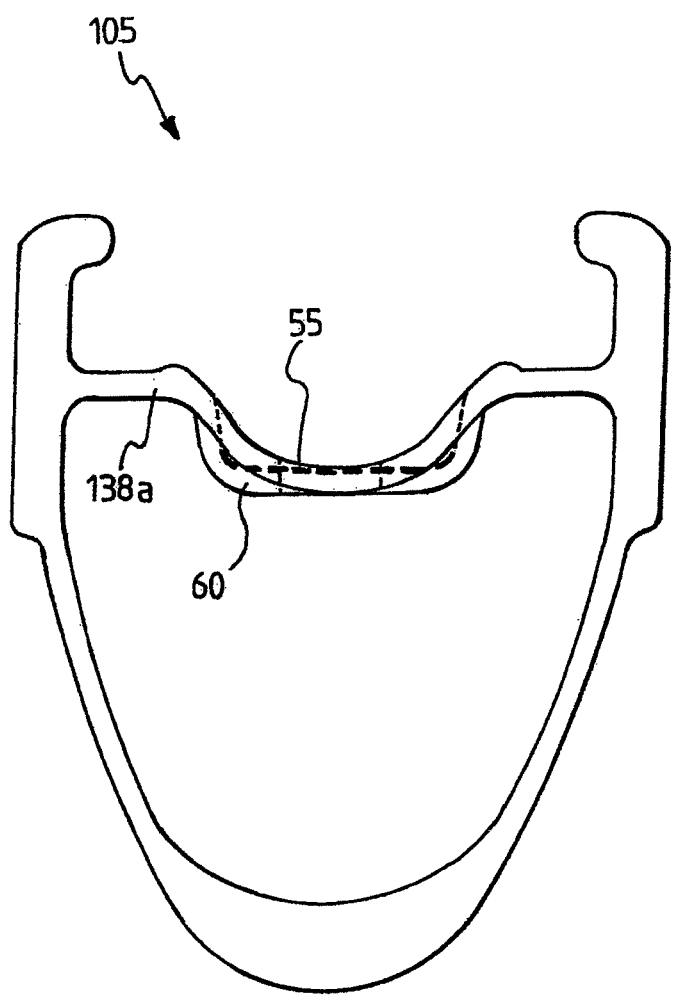
Figure 12:
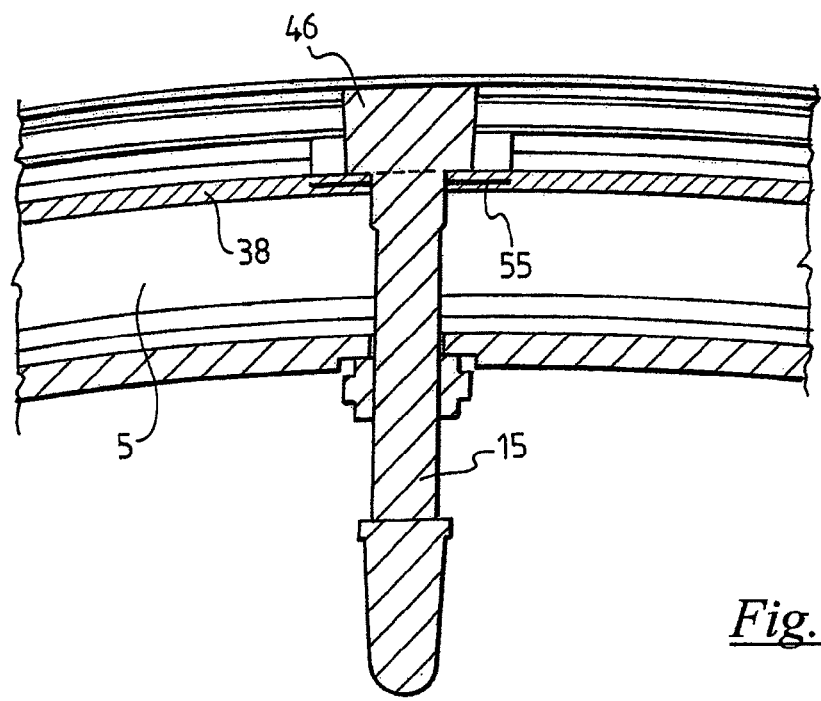
Figure 11:
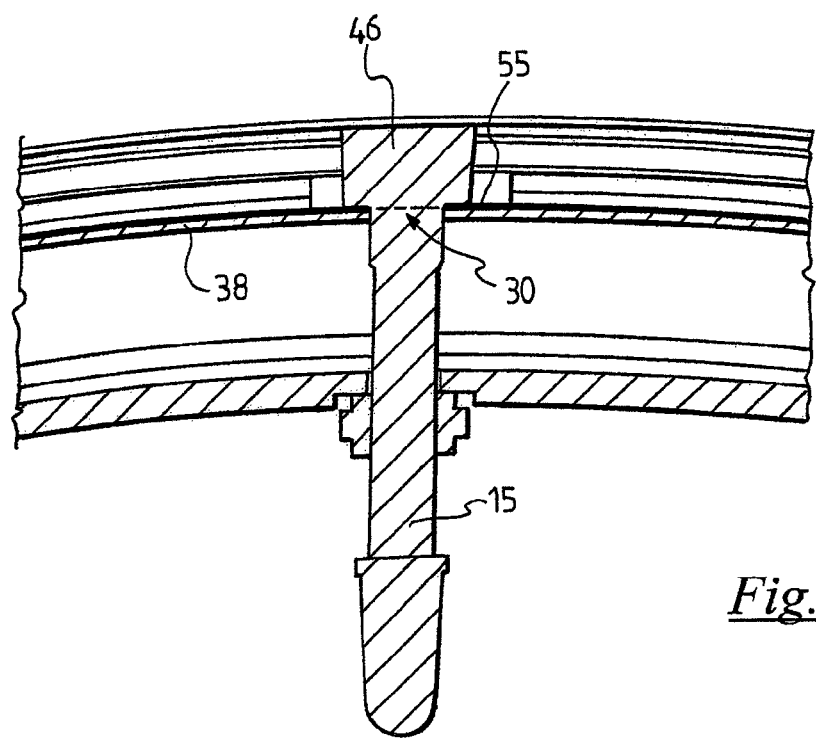

Further characteristics and advantages of the present invention shall become clearer from the following detailed description of preferred embodiments thereof, made with reference to the attached drawings and given for indicating and not limiting purposes. In such drawings:

FIG. 1 schematically represents a perspective view of a tubeless bicycle wheel according to the present invention;

FIG. 2 schematically represents a perspective view of the rim made from composite material of the wheel of FIG. 1;

FIG. 3 schematically represents a section view of a portion of the wheel of FIG. 1, taken according to a radial plane α of FIG. 1, passing through the rotation axis of the wheel and through the longitudinal axis of the inflation valve of the wheel;

FIG. 4 schematically represents a section view of a further embodiment of the tubeless wheel of the invention, said section being taken according to a plane analogous to the radial plane α of FIG. 1;

FIG. 5 schematically represents a section of a portion of the wheel of FIG. 1, taken according to the plane having trace V-V of FIG. 3;

FIGS. 6, 7 and 8 schematically represent section views of further embodiments of portions of wheel of the invention, said sections being taken according to planes analogous to the plane having trace V-V of FIG. 3;

FIG. 9 schematically represents a perspective view of a part of a further embodiment of the rim of the present invention, comprising a through hole for an inflation valve;

FIG. 10 schematically represents a section view of the part of rim of FIG. 9, taken according to the radial plane having trace X-X of FIG. 9, passing through the rotation axis of the rim and passing close to the through hole for an inflation valve, outside a housing seat for a head of said inflation valve;

FIGS. 11 and 12 schematically represent section views of further embodiments of portions of wheel of the invention, said sections being taken according to planes analogous to the plane having trace V-V of FIG. 3.

With initial reference to FIG. 1, a tubeless bicycle wheel in accordance with the present invention is shown. Such a wheel is globally indicated with 1.

The tubeless wheel 1 comprises a rim 5 coupled with a tyre 10 so as to make an airtight coupling. Between the rim 5 and the tyre 10 a chamber is formed in which air is introduced through an inflation valve 15 associated with the rim.

The rim 5 is made from composite material, comprising a filler incorporated in a polymeric matrix. Typically, the composite material of the rim 5 comprises structural fibres incorporated in a polymeric material.

Preferably, the structural fibres are selected from the group consisting of carbon fibres, glass fibres, aramid fibres, ceramic fibres, boron fibres and combinations thereof. The carbon fibres are particularly preferred.

The arrangement of said structural fibres in the polymeric material can be a random arrangement of small pieces or leaflet of structural fibres, an ordered substantially unidirectional arrangement of fibres, an ordered substantially bidirectional arrangement of fibres, or a combination of the above.

Preferably, the polymeric material is thermo-setting and preferably comprises an epoxy resin. However, this does not exclude the possibility of using a thermoplastic.

The rim 5 is connected to a hub 20 through spokes 21. Finally the wheel 1, and therefore the rim 5, has a rotation axis A whose direction defines the axial direction of the wheel (or of the rim), whereas radial direction of the wheel (or of the rim) is referred, in the present description and in the subsequent claims, to a direction perpendicular to the axis A and passing through the axis A itself.

FIG. 2 illustrates the rim 5 in greater detail, in particular it is visible a radially outer portion 38 of the rim 5, i.e. directed towards the tyre 10. It should be observed that on such a portion 38 there are no through openings, apart from a through hole 30 for the inflation valve 15. In this way, to ensure the airtight seal between the radially outer portion 38 of the rim 5 and the tyre 10, it is sufficient that the coupling between hole 30 and inflation valve 15 is airtight. Alternatively, the radially outer portion can also comprise holes for the anchorage of the spokes, which are closed through the application of plugs or a tape.

The rim 5 comprises a body 6 with substantially annular extension. The body 6 is shaped to house and hold, in a final inflation configuration of the tyre 10, borders 11 of radially inner end of the tyre 10 (FIG. 3), in the jargon known as beads.

In particular, the body 6 comprises the radially outer portion 38 with which the tyre 10 is intended to be coupled and a radially inner portion 36 made in a single piece with the radially outer portion 38. The radially inner portion 36 and the radially outer portion 38 form a tubular structure of the rim 5, the radially inner portion 36 and the radially outer portion 38 being connected by two opposite annular side flanks 35. The provision of the radially inner portion 36 in the wheel 1 of the present invention is particularly advantageous since it offers easy anchorage areas for the spokes 21 of the wheel 1.

The radially outer portion 38 includes an annular bottom wall 38a, or upper bridge, where the hole 30 is made, and a pair of annular side walls 40, or fins, extending substantially in radial direction outwards starting from the bottom wall 38a. The side walls 40 comprise in particular a radially outer end portion 40a curved towards the median plane of the rim 5, so as to be able to hold the radially inner end borders 11 of the tyre 10.

In particular, FIG. 3 shows how the side walls 40 cooperate with the tyre 10 and with the bottom wall 38a to form among them a seal chamber 42 of the air. The side walls 40, and in particular the radially outer end portions 40a thereof, hold the tyre 10 in the final inflation configuration contrasting the thrust of the pressurised air on the tyre 10, thus generating the desired airtight coupling.

The bottom wall 38a comprises an annular central recess 44, which extends radially towards the inside of the rim 5 for the entire circumferential extension, the hole 30 being made in such a recess 44.

The inflation valve 15 comprises a threaded shank 15a and a head 46 at an end thereof, such a head 46 being widened with respect to the size of the shank 15a.

When the valve 15 is mounted on the rim 5, the shank 15a is inserted into the hole 30 and the head 46 is inserted into the recess 44. In particular, a bottom surface 48 of the head 46 stops in abutment on a bottom surface of the recess 44.

The head 46 is made from elastically deformable material, for example an elastomer, or it is coated with such a material, so as to be able to adapt to the bottom surface of the recess 44 that is around the hole 30, thus making the desired airtight seal.

In accordance with a first embodiment of the present invention, on a area of bottom wall 38a that surrounds the hole 30 a layer of impermeable-to-air material 55, preferably elastically deformable, different from the composite material used to make the other parts of the rim 5, is integrally associated.

In particular the elastically deformable material is preferably an elastomer selected from the group consisting of nitrite elastomers, hydrogenated nitrite elastomers, ethylene propylene (EPM or EPDM), chloroprene elastomers, polyethylene chlorosulfate, polyacrylic elastomers and fluorine elastomers. In any case non silicon-based rubbers are preferred, since silicon-based rubbers have low adherence, which—in tests carried out by the Applicant—proved insufficient to ensure the desired airtight seal.

The selection of the elastomer is also made based upon its heat resistance, for which reason the elastomers with heat resistance of above 85°, more preferably above 130° and even more preferably above 180° are preferred, so as to withstand the polymerisation cycles to which the rim 5 made from composite material is subjected.

The preferred elastically deformable material amongst those indicated above possesses a tensile strength—according to standards DIN 53504—within the range 4.6±20% MPa including extremes, a percentage extensibility—according to standards DIN 53504—within the range 368±20% including extremes, and a surface hardness "Shore A"—according to standards DIN 53505—within the range 63±20% including extremes.

Alternatively, the impermeable material 55 is a resin, for example applied by spraying. The resin can be the same one used as matrix of the composite material, or a different resin. Such a resin is used by itself or incorporates particles of elastomer, which is preferably selected from those indicated above.

The impermeable material 55 is preferably arranged to form a layer above the bottom wall 38a, as shown in FIG. 3. In particular, the layer of impermeable material 55 extends in axial direction up to the side walls 40, so that its dimensions are large enough and makes its installation easier.

Alternatively, the axial extension can be smaller, until it involves just the area in contact with the head 46 of the valve, as illustrated in the further embodiment of the invention shown in FIG. 4.

FIG. 5 illustrates the preferred extension of the layer of impermeable material 55 in circumferential direction, said direction being defined with respect to the axis A of the rim 5.

In particular, it should be noted that the extension is greater than the bottom surface 48 of the head 46 of the valve 15.

FIG. 6 illustrates a further embodiment of the invention, in which the circumferential extension of the layer of impermeable material 55 is equal to the extension of the bottom surface 48 of the head 46 of the valve 15. However, it is not excluded the possibility of using a circumferential extension of the layer of impermeable material 55 that is lower than the extension of the bottom surface of the head of the valve.

FIG. 7 illustrates a further embodiment of the invention in which the bottom wall 38a comprises two layers of impermeable material 55, a first layer being arranged on the side of the bottom wall 38a directed radially outwards, a second layer being arranged on the side of the bottom wall 38a directed radially inwards.

FIG. 8 illustrates a further embodiment of the invention in which all the thickness of the bottom wall 38a, in the area that surrounds the hole 30, consists of impermeable material 55, i.e. the through hole 30 is in this case defined by cylindrical side walls entirely made from impermeable material 55.

FIG. 11 illustrates a further embodiment that makes it clear how the essential function of the impermeable layer 55 is to obstruct the cracks when they appear on surface. In FIG. 11 an impermeable layer 55 is used consisting of the same, and only, resin as the rim, applied on the entire radially outer surface of the rim. This is advantageous because normally the radially outer portion of the rim 38 is subjected to a finishing processing to ensure the perfect airtight coupling between rim and tyre. Such a processing, however, can generate crevices at any point of the rim, or put in evidence porosities of the material by removing the most outer layer. The coating layer, being able to be applied with extreme precision after the processings of the rim have been carried out, for example by spraying, covers the crevices or porosities that appear on surface without altering the regularity of the coupling profile. The coating layer is obviously cured subsequently with respect to the manufacture of the rim.

FIG. 12 illustrates a further variant in which the impermeable layer 55 is made from elastic material and is inserted inside the thickness of the radially most outer portion of the rim. In this way, given that during the processing for making the hole 30 the elastic material does not crack, it interrupts and seals possible crevices that may form in the polymeric matrix.

Of course, the embodiments of the invention indicated above can be combined with one another, giving rise to further embodiments.

It should be observed that the embodiments in which the layer—or the layers—of impermeable material 55 are larger than the bottom surface 48 of the head 46 of the valve 15, both in axial and circumferential direction, are in any case preferred. In this way, air is prevented from coming out from cracks, crevices or similar that can form in the polymeric matrix during the making of the hole 30.

The layer—or the layers—of impermeable material 55 are in any case integral to the bottom wall 38a of the rim 5, for example through gluing, co-moulding with the remaining composite material of the rim 5, or spray application.

FIG. 9 shows a further embodiment of a rim according to the present invention, which is globally indicated with 105.

In FIG. 9, to structural elements that are identical or equivalent from the functional point of view to those of the rim 5 described above with reference to FIG. 3 the same reference numerals shall be attributed and they shall not be described any further.

In particular, the rim 105 differs from the rim 5 of FIG. 3 because its bottom wall 138a comprises a housing seat 60 for the head of the valve (not shown).

In the illustrated example, the seat 60 is a recess in the bottom wall 138a, which extends radially towards the inside of the rim 105.

In particular, such a recess, substantially at the centre of which the hole 30 is formed, is intended to house the widened head, for example quadrangular-shaped, of the inflation valve so that a side surface of such a head is in abutment with a corresponding side surface of the recess, so as to make it easy to correctly locate the valve in the hole 30.

FIG. 10, which is a section of the rim 105 according to the radial plane having trace X-X of FIG. 9, passing close to but not at the seat 60, shows in the foreground the transversal profile of the bottom wall 138a and in the background, with a broken line, the transversal profile of the aforementioned recess for the head of the valve (not shown).

In this case the layer of impermeable material 55 coats at least one bottom surface of the seat 60.

It should be observed that, in general, the rim of composite material of the invention englobing the layer of impermeable material 55 is made by prearranging a plurality of overlapping layers of composite material, to form the bearing structure of the rim, and then arranging a further layer of impermeable material 55, elastic and/or resinous, at least in the area where the hole for the inflation valve shall be made. The whole of the aforementioned layers of the two materials is cured by subjecting it to a temperature of between 85° C. and 250° C. for a predetermined time. Preferably, the curing temperature is greater than or equal to 120° C., and more preferably is greater than or equal to 130° C. Even more preferably, the curing temperature is greater than or equal to 170° C., whereas the best results are obtained with a curing temperature greater than or equal to 180° C.

Alternatively, it should be observed that the layer of impermeable material 55 can be glued around the hole for the inflation valve, even if in this case the impermeable material 55 is linked less intimately with the composite material of the rim. In any case, the sealing effect of the cracks is ensured, since the points in which they appear on surface are covered.

According to an alternative method, the coating layer 55 is applied to the rim after the curing and subsequently to the mechanical finishing processings, so as to subsequently seal the possible crevices that may have formed.

Of course, a man skilled in the art can bring numerous modifications and variants to the rim made from composite material for a tubeless bicycle wheel, to the rim assembly and to the tubeless wheel comprising such a rim and to the method for manufacturing such a rim described above, in order to satisfy specific and contingent requirements, all of which are however covered by the scope of protection of the present invention as defined by the following claims.

The invention claimed is:

1. A rim for a tubeless bicycle tyre, the rim comprising:
a composite material that is configured to define a radially outer portion shaped for coupling with the tyre, said radially outer portion including a through hole configured to receive a stem of an inflation valve that includes a widened head portion that is larger than said through hole, and at least one first, elastically deformable, impermeable-to-air layer that is integrally fixed with said composite material defining said radially outer portion by co-moulding to an area of said rim that includes said through hole that receives said inflation valve stem but is less than an entire circumferential extension of said radially outer portion.

2. Rim according to claim 1, comprising a second layer which is impermeable-to-air and arranged, around said hole, on a radially inner surface of said radially outer portion, opposite a radially outer surface of said radially outer portion.

3. Rim according to claim 1, wherein said at least one first layer is arranged at least partially on side walls that define said through hole.

4. Rim according to claim 1, wherein said at least one first layer is at least partially arranged inside the thickness of the radially outer portion.

5. Rim according to claim 1, wherein said at least one first impermeable-to-air layer is an elastomer.

6. Rim according to claim 1, wherein on a radially outer surface of said radially outer portion, arranged around said through hole, a housing seat is formed for the widened head portion of said inflation valve.

7. Rim according to claim 1, wherein said at least one first layer has a transversal extension, measured transversally with respect to said through hole, which is greater than a transversal extension around said through hole of an area of a radially outer surface of said radially outer portion that is positioned to be in contact with said widened head portion of said inflation valve.

8. Rim assembly comprising a rim according to claim 1, wherein said inflation valve crosses said through hole.

9. Rim assembly according to claim 8, wherein said widened head portion of said inflation valve is in abutment on said radially outer portion of said rim.

10. A rim made from composite material for a tubeless bicycle wheel comprising:
- a radially outer portion shaped for coupling with a tyre that comprises a through hole formed in an annular central recess of said radially outer portion, said through hole being dimensioned to receive a stem of an inflation valve that includes a head portion that is positioned with a bottom portion of said head portion of said inflation valve in abutment with said through hole, and a portion of said head portion of said inflation valve is in abutment with said annular central recess; and,
- at least one first, elastically deformable, impermeable-to-air layer that is integrally fixed with said radially outer portion by co-moulding to an area of said rim that includes said through hole that receives said inflation valve stem but is less than an entire circumferential extension of said radially outer portion, said at least one first impermeable-to-air layer having a second through hole dimensioned to be at least as large as said stem of said inflation valve and smaller than said head portion of said inflation valve.

* * * * *

UNITED STATES PATENT AND TRADEMARK OFFICE
CERTIFICATE OF CORRECTION

PATENT NO. : 9,079,454 B2  
APPLICATION NO. : 12/401936  
DATED : July 14, 2015  
INVENTOR(S) : Mario Meggiolan Page 1 of 1

It is certified that error appears in the above-identified patent and that said Letters Patent is hereby corrected as shown below:

On the Title Page, in Item (54), and in the Specification, Column 1, Line 2, in Title, delete "BICYCLE BICYCLE" and insert -- BICYCLE --, therefor.

Signed and Sealed this  
Fifteenth Day of December, 2015

Michelle K. Lee  
*Director of the United States Patent and Trademark Office*